United States Patent [19]

Rader

[11] Patent Number: 5,693,684
[45] Date of Patent: Dec. 2, 1997

[54] SPRAYABLE, FOAM-FORMING, PHENOLIC RESIN COMPOSTION, METHOD OF SPRAYING A FOAM-FORMING, PHENOLIC RESIN COMPOSITION, AND A SPRAYED FOAM

[75] Inventor: Samuel L. Rader, Lewisburg, W. Va.

[73] Assignee: Jiffy Foam, Inc., Ronceverte, W. Va.

[21] Appl. No.: 616,638

[22] Filed: Mar. 15, 1996

Related U.S. Application Data

[63] Continuation-in-part of Ser. No. 547,420, Oct. 24, 1995.
[51] Int. Cl.⁶ ..................................................... C08J 9/30
[52] U.S. Cl. .................... 521/78; 521/92; 521/131; 521/181
[58] Field of Search ........................... 521/131, 78, 92, 521/181

[56] References Cited

U.S. PATENT DOCUMENTS

| | | | |
|---|---|---|---|
| 4,207,400 | 6/1980 | Dahms | 521/123 |
| 4,207,401 | 6/1980 | Dahms | 521/123 |
| 4,303,758 | 12/1981 | Gusmer | 521/171 |

*Primary Examiner*—Morton Foelak
*Attorney, Agent, or Firm*—Farkas & Manelli, PLLC

[57] ABSTRACT

A sprayable, foam-forming, phenolic resin composition having the combination of properties of:

(i) a viscosity suitable for spraying, (ii) a cure rate suitable for spraying to prevent running or sagging of sprayed foam, (iii) which when suitably cured provides a foam having a high temperature resistance, and (iv) the cured foam produces substantially non-toxic fumes when burned. The sprayable, foam-forming, phenolic resin composition is made from a phenol-aldehyde resin; optionally a phenol compound; a catalyst for catalyzing a curing reaction of said phenol-aldehyde resin; and a gas-generating compound which generates a gas during said curing reaction of said phenol-aldehyde resin. The invention also provides a method for making a phenolic-resin foam layer and a sprayed phenolic-resin foam layer.

31 Claims, No Drawings

SPRAYABLE, FOAM-FORMING, PHENOLIC RESIN COMPOSTION, METHOD OF SPRAYING A FOAM-FORMING, PHENOLIC RESIN COMPOSITION, AND A SPRAYED FOAM

This application is a Continuation-in-Part of application Ser. No. 08/547,420, filed on Oct. 24, 1995.

The present invention provides a foam-forming, phenolic resin composition suitable for spraying and in place foaming. The present invention also provides a method of spraying a foam-forming phenolic resin composition, and a sprayed phenolic-resin foam.

BACKGROUND OF THE INVENTION

In-place foaming is a process in which two or more reactive components are mixed, such as in a mixing head, where they begin to react. The resulting reaction mixture is then sprayed onto a surface where the mixture foams and cures, thereby forming a cured foam layer on the surface.

A mixing head suitable for use in carrying out in-place foaming is described in U.S. Pat. No. 4,332,335. The head consists of a mixing chamber which communicates with a discharge orifice and first and second ducts which dispense the reactive components into the mixing chamber. Means are provided for regulating the flow of the reactants to the reaction chamber.

To be suitable for spraying, the foam-forming composition must have a low viscosity. For spraying on vertical surfaces the foam-forming composition must also have a fast cure rate to prevent gravity-induced sagging or running of the foam. Therefore, spraying methods have been used primarily for foam-forming compositions consisting of polyurethane and polyisocyanate resins, which have the combination of a low viscosity and a fast cure rate.

However, foam-forming compositions based on polyurethane and polyisocyanate produce a polyurethane foam having an undesirably low temperature resistance, which significantly limits the use of polyurethane foams. For example, insulation for use in residential homes, commercial buildings, foundries, automobiles, boats, and wherever high temperature insulation is required, must have a temperature resistance significantly greater than that of polyurethane foams.

The temperature resistance of the polyurethane foam can be increased slightly by using additives. However, such additives have many undesirable effects on the properties of the foam. Furthermore, when polyurethane foams are burned they undesirably produce fumes which are very toxic to humans.

Foams made from phenolic resins have a temperature resistance significantly greater than polyurethane foams. Furthermore, foams made from phenolic resins do not produce toxic fumes when burned. However, known foam-forming, phenolic resin compositions have not previously been used in spraying methods because they exhibit undesirably slow curing rates, the viscosity of the phenolic resin composition is undesirably high for spray applications, and chemical blowing agents must be added to produce the foam. Use of chemical blowing agents, such as chlorofluorocarbons, are undesirable because they are environmentally unfriendly.

Thus, there is and has been a need for a sprayable, foam-forming composition having the combination of properties of (a) not requiring the use of an external blowing agent, (b) having a viscosity suitable for spraying, (c) having a suitably fast curing rate, and (d) when suitably cured providing a foam having a high temperature resistance and which does not produce toxic fumes when burned.

SUMMARY OF THE INVENTION

It is an objective of the invention to provide a sprayable, foam-forming composition having the combination of properties of a viscosity suitable for spraying, a fast curing rate, and which when suitably cured provides a foam having a high temperature resistance and which does not produce toxic fumes when burned.

Another object of the invention is to provide a sprayable, foam-forming composition which does not require the use of a blowing agent, such as chlorofluorocarbons.

A further object of the invention is to provide a method for spraying a foam-forming phenolic resin composition.

Another object of the invention is to provide a sprayed foam having the combination of a high temperature resistance and which does not produce toxic fumes when burned.

The above objectives and other objectives are obtained by the following.

Surprisingly, it has now been found that a sprayable, foam-forming, phenolic-resin composition having the combination of properties of:

(i) a viscosity suitable for spraying, (ii) a cure rate suitable for spraying to prevent running or sagging of the sprayed foam, (iii) which when suitably cured provides a foam having a high temperature resistance, and (iv) the foam produces substantially non-toxic fumes when burned, can be made from the following components:

a phenol-aldehyde resin;

a catalyst for curing the phenol-aldehyde resin; and a gas-generating compound which autogenously generates a gas during a curing reaction of said phenol-aldehyde resin.

The invention also relates to a method of making phenolic resin foam layer on a surface comprising the steps of:

spraying a foam-forming, phenolic resin composition comprising a phenol-aldehyde resin, a catalyst for catalyzing a curing reaction of the phenol-aldehyde resin, and a gas-generating compound which autogenously generates a gas during a curing reaction of the phenol-aldehyde resin onto the surface, whereby the foam is produced.

The invention further provides a phenolic resin foam comprising a cured phenol-aldehyde resin which has been blown by a gas generated from a gas-generating compound which autogenously generates a gas during a curing reaction of the phenol-aldehyde resin.

DETAILED DESCRIPTION OF PREFERRED EMBODIMENTS

A wide variety of phenol-aldehyde resins, and mixtures of phenol-aldehyde resins can be used. In general, suitable phenol-aldehyde resins are the reaction products of a phenolic compound, such as phenol itself, or substituted phenolic compounds and an aldehyde. Examples of suitable substituted phenolic compounds include alkyl-substituted phenols, such as cresols and nonyl phenol, paraphenyl phenol, resorcinol, and mixtures of such phenols. Preferably, the phenolic compound is a low molecular weight phenolic compound, such as phenol itself.

A wide variety of aldehydes can be used to form the phenol-aldehyde resin. Suitable aldehydes have been found to be acetaldehyde, furfurylaldehyde, and formaldehyde. Preferably the aldehyde is formaldehyde.

The reaction between the aldehyde and the phenolic compound can be carried out in the presence of a basic catalyst, for example sodium hydroxide, potassium hydroxide and/or triethyl amine. For example, the phenolic compound and base can be initially charged into a reactor, and then the aldehyde can be added. To conduct the reaction between the aldehyde and the phenolic compound, the mixture can be heated to, for example, about 70 to about 100° C. This reaction results in the formation of a phenol-aldehyde resin containing aliphatic groups, and methylol groups if formaldehyde is used.

The heating can be maintained until a desired molecular weight of the phenol-aldehyde resin is obtained, for example as measured by free $CH_2O$. The longer the heating is maintained the more methylene bonds that will be formed and the greater the molecular weight of the phenol-aldehyde resin.

For example, when using phenol and formaldehyde, it has been found that usually after about two hours of heating, a phenol-formaldehyde resin is formed having a number-average molecular weight of about 340 and a weight average molecular weight of about 430, which corresponds to a chain length of about 3 to 4 phenol residues.

Oxalic acid can be added as a scavenger for any sodium or potassium chloride which may be formed during the polymerization reaction.

When the desired molecular weight of the phenol-aldehyde resin is obtained, the mixture can be cooled and neutralized with an acid. The mixture comprises a phenol-aldehyde resin suspended in water.

To increase the solids content of the phenol-aldehyde resin/water mixture to an amount suitable for the desired spraying method, water can be removed, such as by distillation. It has been found that a suitable solids content of the phenol-aldehyde resin/water mixture is about 55 to about 85% by weight, and preferably about 65 to about 75% by weight.

The solids content of the sprayable, foam-forming, phenolic resin composition comprising the phenol-aldehyde resin will usually be higher than the solids content of the phenol-aldehyde resin because of the addition of the other components and additives. Suitable solids contents of the sprayable, foam-forming, phenolic resin composition have been found to be about 55 to about 90%.

If the solids content of the phenol-aldehyde resin or the sprayable, foam-forming, phenolic-resin composition is too high for the desired spraying method, a polar solvent such as water or alcohol can be added. One of ordinary skill in the art of spraying will easily be able to adjust the solids content to a desired level for the desired spraying method. Suitable alcohols have been found to be $C_1$–$C_3$ aliphatic alcohols. Examples of preferred alcohols include methanol or ethanol. If desired, the water can be substantially removed from the phenol-aldehyde resin and replaced with another polar solvent, such as the above described alcohol.

Usually, the use of an alcohol as a solvent, in place of water, allows the use of a polymeric isocyanate to provide a more flexible and durable foam having mechanical characteristics similar to those of a urethane foam, but having the high temperature and burning characteristics of a phenolic foam. The polymeric isocyanate can be used as a blowing agent, as described below.

Preferred phenol-aldehyde resins are, for example, characterized by a viscosity of about 50 to about 500 centipoise (cps.) at 25° C. and a number-average molecular weight of about 100 to about 400. However, phenol-aldehyde resins having larger molecular weights and viscosities can be used.

One skilled in the art reading and comprehending this application will easily be able to adjust the curing rate of the sprayable, foam-forming, phenolic resin composition. In general, the curing rate of the sprayable, foam-forming, phenolic resin composition will depend on the following, which are in the order of greater to lesser effect on the curing rate:

(1) the reactivity of the phenol-aldehyde resin;
(2) the type and amount of catalyst;
(3) the amount of urea (if present);
(4) the type and amount of gas-generating compound, and
(5) the amount of phenolic compound (if present).

To prevent gravity-induced sagging or running of the sprayed foam, the sprayable, foam-forming, phenolic resin composition should have a curing rate such that the integrity of the foam has reached a level sufficient to resist gravity-induced sagging or running, within about 3 to about 20 seconds. The curing rate for completely curing the foam can be significantly longer. Where sagging or running of the sprayed foam are not problems to be avoided, such as in horizontal spraying or where more than one layer of foam is to be sprayed, suitable curing rates of the sprayable, foam-forming, phenolic resin composition to reach a level of integrity sufficient for application of a second layer include rates greater than about 20 seconds, for example about 20 seconds to about 1 minute.

The reactivity of the phenol-aldehyde resin can be adjusted by varying the ratio of the aldehyde to the phenolic compound. In general, for a more reactive phenol-aldehyde resin, a greater amount of phenolic compound can be used. Usually, the more aldehyde present the lower the reactivity of the phenol-aldehyde resin. When an unsubstituted phenol is reacted with formaldehyde, a suitable aldehyde:phenol ratio range has been found to be from about 1:1 to about 2:1.

The desired reactivity of the phenol-aldehyde resin will depend on the application. If the foam-forming phenolic resin composition is to be sprayed on a substantially vertical surface where gravity-induced sagging or running of the foam are problems to be avoided, a more reactive phenol-aldehyde resin will be desired. In this instance, an aldehyde:phenol ratio of about 1.2:1 to about 1.4:1 has been found to be suitable.

If the foam-forming phenolic resin composition is to be sprayed onto a substantially horizontal substrate surface, or if a second (or more) layer of the foam-forming, phenolic resin composition (or layer of another reactive composition) is to be applied onto the substrate surface to be covered, a less reactive phenol-aldehyde resin may be desired. A longer curing rate of the sprayable, foam-forming, phenolic resin composition permits the second layer of sprayable, foam-forming phenolic resin composition (or other material) to be applied onto the initial (or subsequent) layer before the underlying layer is fully cured. As a result, stronger bonding can be induced between the adjacent layers as a result of interfacial cross-linking reactions.

For example, if a second layer of the sprayable, foam-forming, phenolic resin composition is sprayed onto a first layer of sprayable, foam-forming, phenolic resin composition before the first layer is fully cured, a stronger bond between the layers will be achieved because of crosslinking therebetween. In this instance, a suitable aldehyde:phenol ratio is generally between about 1.4:1 to about 1.6:1.

The reactivity of the phenol-aldehyde resin can also be adjusted by varying the type of phenolic compound used to make the phenol-aldehyde resin. In general, for a more reactive phenol-aldehyde resin, a low molecular weight phenolic compound can be used, such as phenol or bisphenol A. In general, if a less reactive phenol-aldehyde resin is desired, a higher molecular weight phenolic compound can be used such as cresol. In this manner the reactivity of the phenol-aldehyde resin can be adjusted by varying the molecular weight of the phenolic compound.

The reactivity of the phenol-aldehyde resin can also be adjusted by varying the type of aldehyde used to make the phenol-aldehyde resin. For a more reactive phenol-aldehyde resin an aldehyde containing an aldehyde group that is more reactive with the phenolic compound can be used, such as formaldehyde. If a less reactive phenol-aldehyde resin is desired, an aldehyde containing an aldehyde group that is less reactive with the phenolic compound can be used. Examples of aldehydes having an aldehyde group that is less reactive with the phenolic compound include acetaldehyde, benzylaldehyde or furfarylaldehyde.

The curing rate of the sprayable, foam-forming, phenolic resin composition can be increased by adding urea. In general, the more urea present the more heat that will be generated and the faster the curing rate of the sprayable, foam-forming, phenolic resin composition. The urea reacts with any free aldehyde gives off a significant amount of heat that speeds up the curing reaction. The reactions products of the urea/aldehyde reaction include water. Urea can be added in an amount of about 1 to about 15% by weight of the total sprayable, foam-forming, phenolic resin composition.

In general, the more catalyst (described below) present in the composition the faster the curing rate of the curing rate of the sprayable, foam-forming, phenolic resin composition. In general, the greater the acidity of the catalyst, the faster the curing rate of the curing rate of the sprayable, foam-forming, phenolic resin composition.

The gas-generating compound can reduce the curing rate of the sprayable, foam-forming, phenolic resin composition by reacting with a portion of the catalyst, thereby reducing the amount of catalyst present in the sprayable, foam-forming, phenolic resin composition. For, example if a compound containing a carbonate group is used as the gas generating compound, such a gas-generating compound will react with an acid catalyst to form carbon dioxide and neutralize a portion of the acid catalyst present.

The curing rate of the sprayable, foam-forming phenolic resin composition can also be increased by adding a phenolic compound. The more phenolic compound present in the sprayable, foam-forming phenolic resin composition the faster the curing rate of the sprayable, foam-forming, phenolic resin composition. The heat generated by the exothermic reaction of phenol and any free aldehyde, to form a phenol-aldehyde resin, will accelerate the cure of the sprayable, foam-forming, phenolic resin composition.

The phenol-aldehyde resin present in the sprayable, foam-forming, phenolic resin composition is generally cured in the presence of a catalyst. Catalysts for curing phenolic resins are well known and one skilled in the art after reading and comprehending this application will know what catalysts will work. Examples of suitable catalysts include acid catalysts, amine catalysts and peroxide catalysts. Preferably, the catalyst is an acid catalyst.

Examples of suitable amine catalysts include triethyl amine and triethanolamine.

Examples of suitable peroxide catalysts include compounds containing a (meth)acrylate group. The term "(meth) acrylate" includes methacrylate and acrylate, or mixtures thereof.

Examples of suitable acid catalysts include sulfuric acid, toluene sulfonic acid, xylene sulfonic acid, phenol sulfonic acid, and ethane sulfonic acid.

In a particularly preferred embodiment of the invention, the catalyst is a mixture of toluene sulfonic acid and xylene sulfonic acid or phenol sulfonic acid, in a ratio of about 80% toluene sulfonic acid to about 20% xylene or phenol sulfonic acid. When a gas-generating compound is present which reacts with the acid catalyst, suitable amounts of this catalyst have been found to be about 5 to about 10% by weight of the phenol-aldehyde resin.

The phenol-aldehyde resin is foamed by a gas which is generated during the curing reaction of the phenol-aldehyde resin. Thus, the gas-generating and curing reactions are conducted substantially simultaneously.

For example, the gas generating compound can be a compound containing a carbonate group which generates carbon dioxide in the presence of an acid catalyst. Another example of a gas generating compound is a compound containing an isocyanate group. For example, when urea and isocyanate are used, the urea bonds with any free aldehyde and produces water, the water reacts with the isocyanate to produce an amine and carbon dioxide, which blows the foam. A further example of a suitable gas-generating compound is aluminum which generates hydrogen gas in the presence of an acid catalyst.

Examples of suitable compounds containing a carbonate group include calcium carbonate, aluminum carbonate, ammonium carbonate, sodium carbonate, sodium bicarbonate, or potassium bicarbonate. Sodium bicarbonate or potassium bicarbonate are preferred if the foam is to be sprayed on a vertical wall.

Examples of suitable compounds containing an isocyanate group include methylene diisocyanate (MDI), toluene diisocyanate (TDI), and polymeric methylene diisocyanate (PMDI).

Preferably, when an acid catalyst is used, calcium carbonate or a compound containing isocyanate are used as the gas-generating compound to cause foaming. If a compound containing isocyanate is used, an amine will be formed along with carbon dioxide. The formed amine will advantageously scavenge free formaldehyde.

One skilled in the art reading and comprehending this application will know how to vary the relative amounts of the components in the sprayable, foam-forming, phenolic resin composition for the particular application desired. The phenol-aldehyde resin is usually present in an amount of about 45% to about 80% by weight, preferably about 55 to about 70% by weight of the total weight of the sprayable, foam-forming, phenolic resin composition. The acid catalyst (if present) is usually present in an amount of about 4 to about 10% by weight, preferably about 4 to about 6% by weight of the total weight of the sprayable, foam-forming, phenolic resin composition. The amine catalyst (if present) is usually present in an amount of about 1 to about 3% by weight of the total weight of the sprayable, foam-forming, phenolic resin composition. The calcium carbonate (if used as the gas-generating compound) is usually present in an amount of about 0.5 to about 3% by weight, preferably 0.5 to 1.5% by weight of the total weight of the sprayable, foam-forming, phenolic resin composition. The phenolic compound (if present) can be used, for example, in an amount of about 1 to about 5% by weight, preferably about 1 to about 3% by weight of the total weight of the sprayable, foam-forming, phenolic resin composition.

The sprayable, foam-forming, phenolic-resin composition is characterized by being easily adjustable to provide an especially low viscosity, similar to that achieved with polyurethane foams, which is suitable for spraying. It has been found that viscosities in the range of about 50 to about 500 cps. at 25° C., can be easily achieved by the sprayable, foam-forming, phenolic-resin composition.

The sprayable, foam-forming, phenolic-resin composition can be in form of a sprayable pre-mix, which when combined and sprayed on a surface undergoes a curing and foaming reaction to produce a cured foam. For example, the pre-mix can be a two or more part system, one part comprising the phenol-aldehyde resin and the gas-generating compound, and the other part comprising the catalyst and phenolic compound (if present).

The foaming and curing reactions can be carried out by simply mixing the components, or by combining them in a mixing head of the type previously described. When a mixing head is used, one side of the mixing head can be supplied with a liquid containing the phenol-aldehyde resin, the gas-generating compound, and optionally surfactants. The other side of the mixing head can be supplied with the catalyst, phenol (if present), and optionally surfactants.

In addition, it may be helpful to include a small amount of polysorbate with the phenol-aldehyde resin. This is an anionic surfactant which helps to accelerate emulsification.

Another useful component is gamma butyrolactone, which is suitably used in an amount of about 1 to about 5% by weight, based on the weight of the phenol-aldehyde resin. This component is believed to function as a coupling agent which reduces viscosity and, at the same time accelerates the process of emulsification when the components are mixed. For example, this component can be pre-mixed with the catalyst.

In addition to the foregoing constituents, it is desirable to include surface active agents to assist in the foaming reaction by stabilizing the foam. There are many surfactants which can be used for this purpose, for example polysorbates which have an HLB greater than about 11. Other fatty acids may be used such as those having the structure:

$$R-C \begin{matrix} \nearrow O \\ \searrow O^- Na^+ \end{matrix}$$

Other surfactants which can be used are the dialkyl sulfosuccinates having the structure:

$$\begin{matrix} CH_2-COO-R \\ | \\ Na^+SO_3-CH-COOR \end{matrix}$$

where R is an alkyl group.

Nonionic surfactants which can be used are n-alkyl phenyl polyoxyethy ethers of the formula:

$$R-C_6H_4O(CH_2CH_2O)_xH$$

where R is an alkyl group and X is a positive integer.

Another useful group of surfactants are the dimethyl (polysiloxane) copolymers. There are a wide range of these products which can be used. Examples include General Electric Co.'s SF1188, Union Carbide's L-5340 and Dow Corning's DC 193 and DC 201.

In a preferred embodiment, an anionic surfactant and a cationic surfactant or an anionic surfactant and a dimethyl (polysiloxane) surfactant are included.

The concentration of surfactant varies in accordance with the type of surfactant, but generally is in the range of about 1 to about 7% by weight of the phenol-aldehyde resin. The evaluation of potential surfactants and the amount of surfactant will be known by one skilled in the art reading and comprehending this disclosure.

The cured, sprayed phenolic foam has a high temperature resistance. For example, cured, sprayed phenolic foams made according to this invention can typically withstand sustained temperatures up to about 450° F.

The sprayed and cured foams made according to the present invention have good adhesion to metal, wood, and polymeric surfaces. For example, sprayable, foam-forming, phenolic resin compositions according to the present invention can be sprayed and cured on articles typically covered by other sprayable foam compositions, such as urethane foams. The sprayed foams are also useful in packaging.

Sprayed foams made according to this invention are particularly useful on articles subject to high temperatures, such as HVC panels for use in heating and air ducts, aviation equipment, such as external tanks and internal rocket casings, metal and wood panels for use in construction, and hot steam pipes.

The sprayable, foam-forming, phenolic resin composition is very versatile. For example, sprayed foams can be produced having a density of about 0.5 to about 40 pounds per cubic foot and a closed cell content in a range of about 5 to about 90%.

The cured, sprayed phenolic resin foam has a high temperature and flame resistance. Furthermore, cured, sprayed phenolic resin foam when burned only produces carbon, carbon dioxide, water, and very small traces of hydrogen cyanide. Thus, the cured, sprayed phenolic resin when burned produces fumes which are substantially non-toxic to humans.

The invention will be further explained by the following non-limiting examples.

EXAMPLE 1

A phenol-aldehyde resin was made by combining the following ingredients:
Phenol ($C_6H_5OH$): 16.68 mole,
Formaldehyde 24.96 mole,
Sodium Hydroxide 0.78 mole, and
Triethyl amine 0.158 mole.

This mixture was heated at 90° C. for approximately 2 hours. Then, a free formaldehyde test was performed to determine the formaldehyde content. When the formaldehyde content was less than 1% by weight, the resin was neutralized by adding phenyl sulfonic acid until the pH was in the range of 6.5 to 7.5. The formed phenol-aldehyde resin was distilled to a reaction index of 1.4431 and cooled to 35° C.

The weight average molecular weight of the phenol-formaldehyde resin was 433, the number average molecular weight was 336, and the z-average molecular weight was 501. Thus, the phenol-formaldehyde resin was about 3 to about 4 phenol residue units long.

The phenol-formaldehyde resin had a 30-32 second gel time at 130° C., 62% solids, and a viscosity of 100 cps. 500 grams of the phenol-formaldehyde resin was combined with 0.469 mole of 1.75% $CaCO_3$ and 5 grams of polysorbate to make a part A mixture. The part A mixture was supplied to the A Side of a mixing head.

A part B mixture was made by combining 35 grams of DC 193, which was 7% by weight based on the weight of phenol-aldehyde resin, 50 grams of an 80/20 mixture of a 20% toluene sulfonic acid and xylene sulfonic acid solution in water, and 15 grams of gamma butyrolactone. The part B mixture was supplied to the B side of the mixing head.

The part A and part B mixtures were combined in a mixing head at ratios of 5:1 and 3:1, (part A:part B) to produce two sprayed foams. The mixing head used was a Gusmer Mixing head having a dynamic mixer.

The flame spread and the smoke density of the sprayed foams were tested using ASTM E84. The sprayed foam produced from the 3:1 ratio exhibited a flame spread of 10 and smoke density of 5.0 The sprayed foam produced from the 5:1 ratio exhibited a flame spread of 15 and smoke density of 5. These values are significantly lower than other non-phenolic resin foams. A lower value for the flame spread and the smoke density is better. A typical urethane foam has a flame spread of 50 and a smoke density of 100.

EXAMPLE 2

A phenol/formaldehyde resin was made by combining 30 moles of 37.5% formaldehyde, 20 moles of phenol ($C_6H_5OH$), 1 mole sodium hydroxide, and 0.169 mole triethylamine, as follows. The phenol and formaldehyde were mixed and heated to 60° C. Then the sodium hydroxide and triethylamine were added. The mixture refluxed and the temperature rose to 90° C. The mixture was maintained at this temperature for 1 hour 45 minutes. At this point, the free formaldehyde content was 2.8%. Heating was continued for 30 minutes, at which time the free formaldehyde content was 0.65%. The reaction was shut down and 30 grams phenyl sulfonic acid was added, reducing the pH to 8.4. Another 10 grams phenyl sulfonic acid was added, reducing the pH to 8. Finally, another 7 grams of phenyl sulfonic acid was added, reducing the pH to 7.8.

The mixture was then distilled to a distillation index of 1.4550 and cooled to 35° C. 139 grams of $CaCO_3$ was then added and mixed well with the resin. The mixture was then refrigerated for 24 hours. The physical properties of the phenol-formaldehyde resin mixture were as follows:
Viscosity: 75 cps
Solids: 58%
Free formaldehyde: 0.6%
Gel Time 27 sec at 120° C.

The mixture was sprayed onto a steel surface and foamed using an Instafoam Froth Pack Gun with a disposable static mixer having 15 elements.

The flame spread and the smoke density of the sprayed foam was tested using ASTM E84. The sprayed foam exhibited a flame spread of 10 and smoke density of 5.0. These values are significantly lower than other non-phenolic resin foams. A lower value for the flame spread and the smoke density is better. A typical urethane foam has a flame spread of 50 and a smoke density of 100.

EXAMPLE 3

A phenol-aldehyde resin was made in the same manner as in Example 2. The weight average molecular weight of the phenol-formaldehyde resin was 426, the number average molecular weight was 349, and the z-average molecular weight was 538. Thus, the phenol-formaldehyde resin was about 3 to about 4 phenol residue units long.

The phenol-aldehyde resin had a 60% solids content, 30 second gel time, and a viscosity of 150 cps (25° C.). Twenty parts of this resin were mixed with 0.5 part of polysorbate and 1.5 part of $CaCO_3$ to make a part A mixture. The part A mixture was supplied to the A side of a mixing head.

A part B mixture was made by combining 10 parts of an 80/20 mixture of toluene sulfonic acid and xylene sulfonic acid for each 100 parts of phenol-aldehyde resin, 5 parts of silicone DC 193 for each 100 parts of phenol-aldehyde resin, and 3 parts butyrolactone for each 100 parts of phenol-aldehyde resin. The part B mixture was supplied to the B side of the mixing head.

The components of part A were mixed at 25° C. and poured into a vessel. The vessel was pressurized to 180 psi. The components of Part B were combined at 25° C. and added to another vessel. 4 parts of part A was combined with 1 part of part B.

The mixture was sprayed onto a steel surface and foamed using an Instafoam Froth Pack Gun with a disposable static mixer having 15 elements.

The flame spread and the smoke density of the sprayed foam was tested using ASTM E84. The sprayed foam exhibited a flame spread of 15 and smoke density of 5.0. These values are significantly lower than other non-phenolic resin foams. A lower value for the flame spread and the smoke density is better. A typical urethane foam has a flame spread of 50 and a smoke density of 100.

EXAMPLE 4

The part A and part B from Example 3 components were sprayed on a heated panel using a Gusmer Mixing head having a dynamic mixer. The panel was heated to 180°–200° F. and the cure time was between 7 to 13 seconds. The mix ratio was 2.2:1 (part A:part B). The foaming and curing reaction began while in the foam composition was in the air before it hit the panel.

Another layer was sprayed over the first layer before the first layer fully cured. This provided a stronger bond between the foam layers formed. PMDI was added to part A in an amount of 2% by weight. This is a secondary catalyst. Once the primary catalyst is spent, then the PMDI or TDI or MDI creates sufficient heat to cure the phenol-aldehyde resin after the first has reacted.

EXAMPLE 5

A two part foam-forming composition was made by combining the following components.
Part A:
First, three resins were combined in the following amounts:

75% by weight of a phenol-aldehyde resin having gel time of about 20–30 seconds, a viscosity of 50 cps.

20% by weight of a phenol-aldehyde resin having 8.3% urea, a gel time of 1.30 seconds, a viscosity of 2000 cps. (25° C.); and 5% by weight of a Novolac resin having a gel time of 30 seconds, a viscosity of 4000 cps. (25° C.).

Then, the following components were added to the resin mixture;

$CaCO_3$ 1% by weight of total weight of resins;

PMDI 1.5% by weight of total weight of resins. All the components were mixed together under high shear than drawn off into a container labeled part A.

A part B was made by combining the following components:

Toluene sulfonic acid/phenol sulfonic acid 80/20 blend, 10% by weight of part A;

Oxalic Acid 1% by weight of part A;

Silicone, DC 193, 7% by weight of part A; and

Gamma butyrolactone, 3% by weight of part A.

All components were mixed together charged into a container labeled part B.

The both part A and part B were metered into a mixing, sprayable nozzle at the ratio of 2.1:1 (part A:part B). The mixture was then sprayed onto a primed steel substrate where it cured and foamed. The foam had a 5 second froth time and a full cure in 35 sec. The yield was 2 pounds per cubic foot of foam having good adhesion properties to the primed steel surface.

EXAMPLE 6

A two part foam-forming composition was made by combining the following components.

Part A:

First, two resins were combined as follows:

85% by weight of a phenol-aldehyde resin having a gel time of about 20–23 seconds, a viscosity of 50 cps. (25° C.), and a solids content of 85%; and 15% by weight of a phenol-aldehyde resin having a gel time of a 2 minutes, a viscosity of 4000 cps. (25° C.).

Then, the following components were added to the resin mixture:

Tween, 2.3% by weight of total weight of resins;
CaCO$_3$, 2% by weight of total weight of resins; and
PMDI, 1% by weight of total weight of resins.

All components were mixed and charged into a 2.5 gallon pot pressurized at 150 PSIG.

A part B was made by combining the following components:

Toluene sulfonic acid/xylene sulfonic acid, 80% by weight of total weight of resins.
DC 193, 7% by weight of total weight of resins;
Gamma butyrolactone, 3% by weight of total weight of resins; and
SF1188, 2% by weight of total weight of resins.

The components were combined and charged into a 2.5 gallon pot pressurized at 65 PSIG.

Using the viscosities and specific gravity, the ratio was calculated to be 5:1 (part A:part B), specific gravity 1.24, viscosity was 100 cps. at 25° C.

Both parts A and B were then charged through a liquid control static mixing gun and deposited into a mold and allowed to fully cure. The cured foam had the following physical properties.

Pounds per cubic foot: 2.5
Compression: 38 psi
Skin was very tough and about 15 mil thick.
Foam time was about 35 seconds, which is suitable for horizontal spraying or molds.
Pot life was 5 seconds.

EXAMPLE 7

A phenol-aldehyde resin mixture was made as follows. 2919 grams of phenol and 2000 grams of formaldehyde were added to a reaction vessel and heated to about 75° C. 43.79 grams of sodium hydroxide and 29.19 grams of triethylamine were added to the phenol mixture and the resulting reaction mixture was heated to about 90° C. for about 1 hour and 35 minutes to react the phenol and the formaldehyde. A free formaldehyde test was performed on the reaction mixture, which yielded a formaldehyde content of 0.181%. The phenol-aldehyde resin formed was then neutralized to a pH in the range of about 7 to about 8 by adding 13 grams of sulfuric acid. The phenol-aldehyde resin was distilled until a refractive index of approximately 1.441 was obtained, which was about 40 minutes, and then cooled to about 50° C.

The weight average molecular weight of the phenol-formaldehyde resin was 425, the number average molecular weight was 348, and the z-average molecular weight was 536. Thus, the phenol-formaldehyde resin was about 3 to about 4 phenol units long.

120.1 grams of CO(NH$_2$)$_2$ and 300.52 grams of NaHCO$_3$ were added to the phenol-aldehyde resin, at which time the reaction mixture froathed over the top of the reaction vessel. It was later found that by cooling the reaction mixture to about 25° C. or below, the froathing could be avoided.

A part A mixture was made by combining the phenol-aldehyde resin mixture was mixed with the following ingredients and agitated for three minutes at 1300 rpm:

| Resin mixture | 100 parts |
|---|---|
| Tween | 5 parts |
| DC 193 | 7 parts. |

A part B mixture was made by combining the following ingredients:

| PSA | 40 parts, |
|---|---|
| Gamma Butyrolactone | 5 parts, and |
| Propylene Glycol | 5 parts. |

The part A and part B mixtures were combined in a chamber and pressurized to about 150 psig to make a foamable mixture. The foamable mixture was sprayed onto a vertical surface in layers until about eight inches of foam was formed, using an Instafoam Froth Pack Gun.

The foam produced had the following properties:

| Cream Time: | 2 seconds |
|---|---|
| Foam time: | 7 seconds |
| Foam density: | 1.5 PCF |
| Compression: | 18 PSI perpendicular to foamed surface |
| | 20 PSI parallel to foamed surface |
| Closed cell content: | 90%. |

The cream time is the time from mixing parts A and B until a cream color was formed from froathing. The foam time is the amount of time the foamable mixture took to fully foam and cure after being sprayed onto the vertical surface. The compression was measured using ASTM 695–69.

EXAMPLE 8

A phenol-aldehyde resin mixture was made as follows. 2477.13 grams of phenol and 2000 grams of formaldehyde were added to a reaction vessel and heated to about 75° C. 46.7 grams of sodium hydroxide and 32.1 grams of triethylamine were added to the phenol mixture and the resulting reaction mixture was heated to about 90° C. for about 2 hours and 25 minutes. A free formaldehyde test was performed on the reaction mixture, which yielded a formaldehyde content of 0.278%. The reaction was allowed to cook at 90° C. for another 35 minutes, after which the free formaldehyde content was 0.19%. The phenol-aldehyde resin formed was then neutralized to a pH in the range of about 7 to about 8 by adding 15 grams of sulfuric acid. The phenol-aldehyde resin was distilled until a refractive index of approximately 1.4872 was obtained, and then cooled to about 50° C. 135.6 grams of CO(NH$_2$)$_2$ and 273 grams of NaHCO$_3$ were added to the phenol-aldehyde resin, at which time the reaction mixture froathed over the top of the reaction vessel. It was later found that by cooling the reaction mixture to about 25° C. or below, the froathing could be avoided.

A part A mixture was made by combining the phenol-aldehyde resin mixture with the following ingredients:

| Resin mixture | 100 parts |
|---|---|
| Tween | 5 parts |
| DC 193 | 5 parts. |

A part B mixture was made by combining the following ingredients:

| PSA | 40 parts, |
|---|---|
| Gamma Butyrolactone | 5 parts, and |
| Propylene Glycol | 5 parts. |

The part A and part B mixtures were combined in a chamber and pressurized under nitrogen to about 160 psig. The mixture was sprayed onto a vertical metal surface using an Instafoam Froth Pack Gun.

The foam produced had the following properties:

| Cream Time: | 5 seconds |
|---|---|
| Foam time: | 14 seconds |
| Foam density: | 2.1 PCF |
| Compression: | 20 PSI perpendicular to sprayed surface |
| | 25 PSI parallel to sprayed surface |
| Closed cell content: | 95%. |

The foam exhibited a slight amount of sagging. The foam cured well and looked good.

EXAMPLE 9

A phenol-aldehyde resin mixture was made as follows. 2919 grams of phenol and 2000 grams of formaldehyde were added to a reaction vessel and heated to about 75° C. 43.79 grams of sodium hydroxide and 29.19 grams of triethylamine were added to the phenol mixture and the resulting reaction mixture was heated to about 90° C. for about 1 hours and 35 minutes. A free formaldehyde test was performed on the reaction mixture, which yielded a form-aldehyde content of 0.181%. The phenol-aldehyde resin formed was then neutralized to a pH in the range of about 7 to about 8 by adding 13 grams of sulfuric acid. The phenol-aldehyde resin formed was distilled until a refractive index of approximately 1.441 was obtained, which was about 40 minutes, and then cooled to about 25° C. 120.1 grams of $CO(NH_2)_2$ and 300 grams of $Na(CO_3)_2$ were added to the phenol-aldehyde resin.

A part A mixture was made by combining the phenol-aldehyde resin mixture with the following ingredients:

| Resin mixture | 100 parts |
|---|---|
| Tween | 5 parts |
| DC 193 | 5 parts. |

A part B mixture was made by combining the following ingredients:

| PSA | 40 parts, |
|---|---|
| Gamma Butyrolactone | 5 parts, and |
| Propylene Glycol | 5 parts. |

The part A and part B mixtures were combined in a chamber and pressurized under nitrogen to about 150 psig. The mixture was sprayed using an Instafoam Froth Pack Gun onto a vertical surface in foamed layers of about 0.5 inches thick until a thickness of about 4 inches of foam was obtained.

The foam produced had the following properties:

| Cream Time: | 2 seconds |
|---|---|
| Foam time: | 7 seconds |
| Foam density: | 2.5 PCF |
| Compression: | 28 PSI perpendicular to sprayed surface |
| | 40 PSI parallel to ssprayed surface |
| Closed cell content: | 94%. |

The foam exhibited no outcasting. The skin of the foam looked good, smooth and tight celled.

EXAMPLE 10

A phenol-aldehyde resin mixture was made as follows. 2477.13 grams of phenol and 2000 grams of formaldehyde were added to a reaction vessel and heated to about 75° C. 46.7 grams of sodium hydroxide and 32.1 grams of triethylamine were added to the phenol mixture and the resulting reaction mixture was heated to about 90° C. for about 2 hours and 25 minutes. A free formaldehyde test was performed on the reaction mixture, which yielded a formaldehyde content of 0.278%. The reaction mixture was heated at 90° C. for another 35 minutes, after which the free formaldehyde content was about 0.19%. The phenol-aldehyde resin formed was then neutralized to a pH in the range of about 7 to about 8 by adding 15 grams of sulfuric acid. The phenol-aldehyde resin formed was distilled until a refractive index of approximately 1.4872 was obtained, and then cooled to about 25° C. 135.6 grams of $CO(NH_2)_2$ and 273.2 grams of $Na(CO_3)_2$ were added to the phenol-aldehyde resin.

A part A mixture was made by combining the phenol-aldehyde resin mixture with the following ingredients:

| Resin mixture | 100 parts |
|---|---|
| Tween | 5 parts |
| DC 193 | 5 parts. |

A part B mixture was made by combining the following ingredients:

| PSA | 35 parts, |
|---|---|
| Gamma Butyrolactone | 5 parts, |
| Propylene Glycol | 5 parts, and |
| Novolac resin | 5 parts. |

The Novolac resin was the same as was used in Example 5.

The part A and part B mixtures were combined in a chamber and pressurized under nitrogen to about 160 psig. The mixture was sprayed using an Instafoam Froth Pack Gun onto a metal vertical surface in 2 foamed layers.

The foam produced had the following properties:

| | |
|---|---|
| Cream Time: | 5 seconds |
| Foam time: | 14 seconds |
| Foam density: | 1.8 PCF |
| Compression: | 18 PSI perpendicular to sprayed surface |
| | 20 PSI parallel to sprayed surface |
| Closed cell content: | 87%. |

The foam exhibited no sagging. The cured well and looked good when cured.

While the claimed invention has been described in detail and with reference to specific embodiments thereof, it will be apparent to one of ordinary skill in the art that various changes and modifications can be made therein without departing from the spirit and scope thereof.

I claim:

1. A sprayable, foam-forming, phenolic resin composition comprising:

a phenol-aldehyde resin;

a catalyst for catalyzing a curing reaction of said phenol-aldehyde resin; and a gas-generating compound which generates a gas during said curing reaction of said phenol-aldehyde resin, wherein said composition has a viscosity of about 50 to about 500 cps (25° C.).

2. A composition according to claim 1, wherein said composition further comprises a phenolic compound.

3. A composition according to claim 1, wherein said composition is adapted to provide the combination of properties of:

(i) a viscosity suitable for spraying, (ii) a cure rate suitable for spraying to substantially prevent gravity-induced running or sagging of sprayed foam, (iii) which when suitably cured provides a foam having a high temperature resistance, and (iv) the cured foam produces substantially non-toxic fumes when burned.

4. A composition according to claim 1, wherein said composition is adapted to provide the combination of properties of:

(i) a viscosity suitable for spraying, (ii) which when suitably cured provides a foam having a high temperature resistance, and (iii) the cured foam produces substantially non-toxic fumes when burned.

5. A composition according to claim 1, wherein said catalyst comprises an acid catalyst and said gas-generating compound generates carbon dioxide in the presence of said acid catalyst.

6. A composition according to claim 5, wherein said gas-generating compound contains a carbonate group.

7. A composition according to claim 2, wherein said gas-generating compound comprises at least one of sodium bicarbonate or potassium bicarbonate.

8. A composition according to claim 1, wherein said catalyst comprises an acid catalyst and said gas-generating compound generates hydrogen in the presence of said acid catalyst.

9. A composition according to claim 1, wherein said catalyst comprises an acid catalyst and said gas-generating compound contains an isocyanate group which in the presence of said acid catalyst produces carbon dioxide and an amine which scavenges unreacted aldehyde groups.

10. A composition according to claim 1, further comprising a two or more part pre-mix, wherein a first part comprises said phenol-aldehyde resin a second part comprises said catalyst.

11. A composition according to claim 10, wherein said first part further comprises said gas-generating compound.

12. A composition according to claim 1, wherein said phenol-aldehyde resin comprises a reaction product of phenol and formaldehyde.

13. A composition according to claim 1, wherein a ratio of phenol:aldehyde in said phenol-aldehyde resin is from about 1:2 to about 1:1.

14. A composition according to claim 1, wherein a ratio of phenol:aldehyde in said phenol-aldehyde resin is from about 1:1.2 to about 1:1.4.

15. A composition according to claim 1, further comprising a polar solvent in an amount to provide a solids content suitable for spraying said sprayable, foam-forming, phenolic resin composition.

16. A sprayable, foam-forming, phenolic resin composition comprising:

a phenol-aldehyde resin;

an acid catalyst for catalyzing a curing reaction of said phenol-aldehyde resin; and A gas-generating compound which generates a gas during said curing reaction of said phenol-aldehyde resin, said gas-generating compound containing a carbonate group, wherein said composition has a viscosity of about 50 to about 500 cps (25° C.).

17. A composition according to claim 16, wherein said gas-generating compound comprises at least one of sodium bicarbonate or potassium bicarbonate.

18. A composition according to claim 16, wherein said phenol-aldehyde resin comprises a reaction product of phenol and formaldehyde.

19. A method of making phenolic resin foam layer on a surface comprising the steps of:

spraying a foam-forming, phenolic resin composition having a viscosity of about 50 to about 500 cps (25° C.) and comprising a phenol-aldehyde resin, a catalyst for catalyzing a curing reaction of said phenol-aldehyde resin, and a gas-generating compound which generates carbon dioxide during said curing reaction of said phenol-aldehyde resin onto said surface, whereby said foam is produced.

20. A method according to claim 19, further comprising the step of spraying another layer of said foam-forming, phenolic resin composition over a first layer of said foam-forming, phenolic resin composition before said first layer is fully cured.

21. A method of forming a phenolic resin foam layer substantially free from gravity-induced sagging or running comprising the steps of:

spraying a foam-forming, phenolic resin composition having a viscosity of about 50 to about 500 cps (25° C.) and comprising a phenol-aldehyde resin, a phenol compound capable of reacting with free aldehyde to generate heat and increase the curing rate of said composition, a catalyst for catalyzing a curing reaction of said phenol-aldehyde resin, and a gas-generating compound containing a carbonate group that generates carbon dioxide during said curing reaction of said phenol-aldehyde resin, onto said surface, whereby said foam is produced.

22. A sprayed phenolic resin foam comprising a cured phenol-aldehyde resin composition which has been blown by a gas generated from a gas-generating compound which generates a gas during a curing reaction of said phenol-aldehyde resin composition, and wherein said composition has a viscosity of about 50 to about 500 cps (25° C.) prior to curing.

23. A sprayed phenolic resin foam comprising a cured phenol-aldehyde resin composition which has been blown by carbon dioxide generated from a gas-generating compound containing a carbonate group which generates carbon dioxide in the presence of an acid catalyst during a curing reaction of said phenol-aldehyde resin composition, and wherein said composition has a viscosity of about 50 to about 500 cps (25° C.) prior to curing.

24. An article having a sprayed-on phenolic resin foam layer comprising a cured phenol-aldehyde resin composition which has been blown by a gas generated from a gas-generating compound which generates a gas during a curing reaction of said phenol-aldehyde resin composition, and wherein said composition has a viscosity of about 50 to about 500 cps (25° C.) prior to curing.

25. An article according to claim 24, wherein said article comprises a panel.

26. An article having a sprayed-on phenolic resin foam layer comprising a cured phenol-aldehyde resin composition which has been blown by carbon dioxide generated from a gas-generating compound containing a carbonate group or isocyanate group which generates carbon dioxide in the presence of an acid catalyst during a curing reaction of said phenol-aldehyde resin composition, and wherein said composition has a viscosity of about 50 to about 500 cps (25° C.) prior to curing.

27. An article according to claim 26, wherein said article comprises a panel.

28. A composition according to claim 1, wherein said composition has a solids content of about 55 to about 90%.

29. A composition according to claim 16, wherein said composition has a solids content of about 55 to about 90%.

30. A composition according to claim 16, further comprising a phenolic compound capable of reacting with free aldehyde to generate heat and increase the curing rate of said composition.

31. A sprayable, foam-forming, phenolic resin composition comprising:

a phenol-aldehyde resin;

a catalyst for catalyzing a curing reaction of said phenol-aldehyde resin;

a phenolic compound capable of reacting with free aldehyde to generate heat and increase the curing rate of said composition; and a gas-generating compound which generates a gas during said curing reaction of said phenol-aldehyde resin, wherein said composition has a viscosity of about 50 to about 500 cps (25° C.).

* * * * *